United States Patent Office 3,843,546
Patented Oct. 22, 1974

3,843,546
PROCESS FOR FLUORINATING CHLOROALKANES AND FLUORINATING COMPOSITION THEREFOR
Igor Sobolev, Orinda, and Erwin Panusch, Livermore, Calif., assignors to Kaiser Aluminum & Chemical Corporation, Oakland, Calif.
Filed Apr. 12, 1973, Ser. No. 350,594
Int. Cl. C01b 7/20; C07c 19/08
U.S. Cl. 252—182
8 Claims

ABSTRACT OF THE DISCLOSURE

Chloroalkanes are converted in vapor phase, in a stirred, solid bed reactor to chlorofluoroalkanes by using a free-flowing fluorinating agent comprising a mixture of sodium fluoferrate ($Na_3FeF_6$) and an inert dispersant, such as finely divided carbon. The fluorinating agent can be made by reacting NaF with $FeCl_3$ in an aqueous system; and the dispersant can be incorporated either in the aqueous system, where it forms nuclei for $Na_3FeF_6$ formation; or added to already prepared $Na_3FeF_6$. Use of the fluorinating agent results in high yields of chlorofluoroalkanes without forming undesirable byproducts and it eliminates agglomeration of solids within the reactor.

BACKGROUND OF THE INVENTION

This invention relates to the preparation of chlorofluoroalkanes by the vapor phase fluorination of chloroalkanes using as source of fluorine a composition comprising a mixture of sodium fluoferrate and an inert dispersant, such as finely divided carbon. It further relates to the preparation of the sodium fluoferrate fluorinating agent.

Many methods are known for the preparation of chlorofluorocarbons which are widely used, for example as blowing agents or as refrigerants. In many cases the fluorination of chloroalkanes proceeds in the vapor phase and as the source of fluorine, a solid, inorganic fluoride salt is utilized. During the conversion of chloroalkanes to chlorofluoroalkanes, the inorganic fluoride exchanges its fluorine with chlorine and thus becomes gradually exhausted as a fluorinating agent. Concurrent with the loss of fluorine content, freshly formed inorganic chloride salt deposits on the surface of the fluorinating agent and this coating can prevent the release of further fluorine from the fluorinating agent with consequently accelerated loss of fluorinating effectiveness. To avoid this latter occurrence and assure maximum available effectiveness in the fluorinating system, the inorganic fluoride is often maintained in a fluidized bed, and as an alternative agitation of the fluorinating agent frequently is employed. However, even under these operating conditions multiple process difficulties arise. For example, when $CaF_2$ is utilized as the fluorinating agent, the exchange of fluorine with chlorine results in the formation of $CaCl_2$ which acts as a coating agent at the temperatures usually employed in fluidized bed fluorination of vaporized chloroalkanes. This coating will reduce the assessibility of the fluorine sites, causing a reduction in the rate and extent of fluorination.

Agitation of the inorganic fluorinating agent also fails to result in increased efficiency; rather it promotes the uniform coating of the remaining $CaF_2$ and in addition it causes the formation of large agglomerates and thus convets the fluorinating agent to an ineffective mass.

To avoid the above-mentioned problems, U.S. Pat. 2,739,989 to C. M. Barringer et al. has suggested the incorporation of carbon particles in $CaF_2$ fluorinating agent employed in a fluidized bed for the vapor phase fluorination of chloroalkanes. Suitably, relatively coarse carbon having a particle size or diameter between 0.04–0.15 mm. has been recommended for use in intimate admixture with $CaF_2$. The maximum amount of carbon to be mixed with the $CaF_2$ was found to be about 60% by weight of the fluidized bed, with 2–5% by weight of carbon being recommended as the most efficient quantity. The incorporation of carbon particles assists in preventing agglomeration, but cannot counteract the coating of $CaF_2$ with $CaCl_2$. C. B. Barringer et al. have also found that to obtain best results in the fluidized-bed, vapor-phase fluorination of chloroalkanes, the mixture of $CaF_2$-carbon particles should contain a diluent employed in an amount equivalent to 30–89% by weight of the mixture. The recommended diluents include $CaF_2$, $SiO_2$ and $Al_2O_3$. The addition of either $SiO_2$ or $Al_2O_3$, however, results in the formation of $CO_2$ byproduct due to their tendency to act as oxidizing agents in the fluorination atmosphere described. Thus while agglomeration in the fluidized system of this reference is eliminated, neither the coating of the fluorinating agent, nor the formation of the undesirable $CO_2$ byproduct can be avoided.

It has also been known that sodium fluoferrate can be employed as a fluorinating agent. An article in the Chemiker-Zeitung/Chemische Apparatur, Volume 92, Number 5 (Mar. 5, 1968), pages 137–142 by B. Cornils et al, has described the fluorination of carbon tetrachloride using sodium fluoferrate as the fluorinating agent. The authors have found that while sodium fluoferrate is an effective fluorinating agent capable of exchanging substantially all of its fluorine with chlorine, its use presents several problems which significantly affect its usefulness in the conversion of chloroalkanes to chlorofluoroalkanes. The problems involved in the use of sodium fluoferrate were found to include the sublimation of the $FeCl_3$ decomposition product and the coating of the remaining $Na_3FeF_6$ fluorinating agent with the $FeCl_3$. Consequently, the authors of this reference concluded that within the experimental temperature range of 305°–420° C., coating of the fluorinating agent occurs at lower temperatures within the range, while at the upper temperature limit, sublimation of the formed $FeCl_3$ significantly influences the operation of the fluorinating system.

It has now been discovered that vapor-phase fluorination of chloroalkanes in high yield and efficiency can be achieved without encountering any of the difficulties presented by the prior art processes by using as fluorinating agent a mixture of sodium fluoferrate and carbon in a stirred bed reactor. In addition a novel process is provided for the preparation of the sodium fluoferrate fluorinating agent either from fresh starting materials or from recycled exhausted fluorinating agent.

SUMMARY OF THE INVENTION

Figure 1:
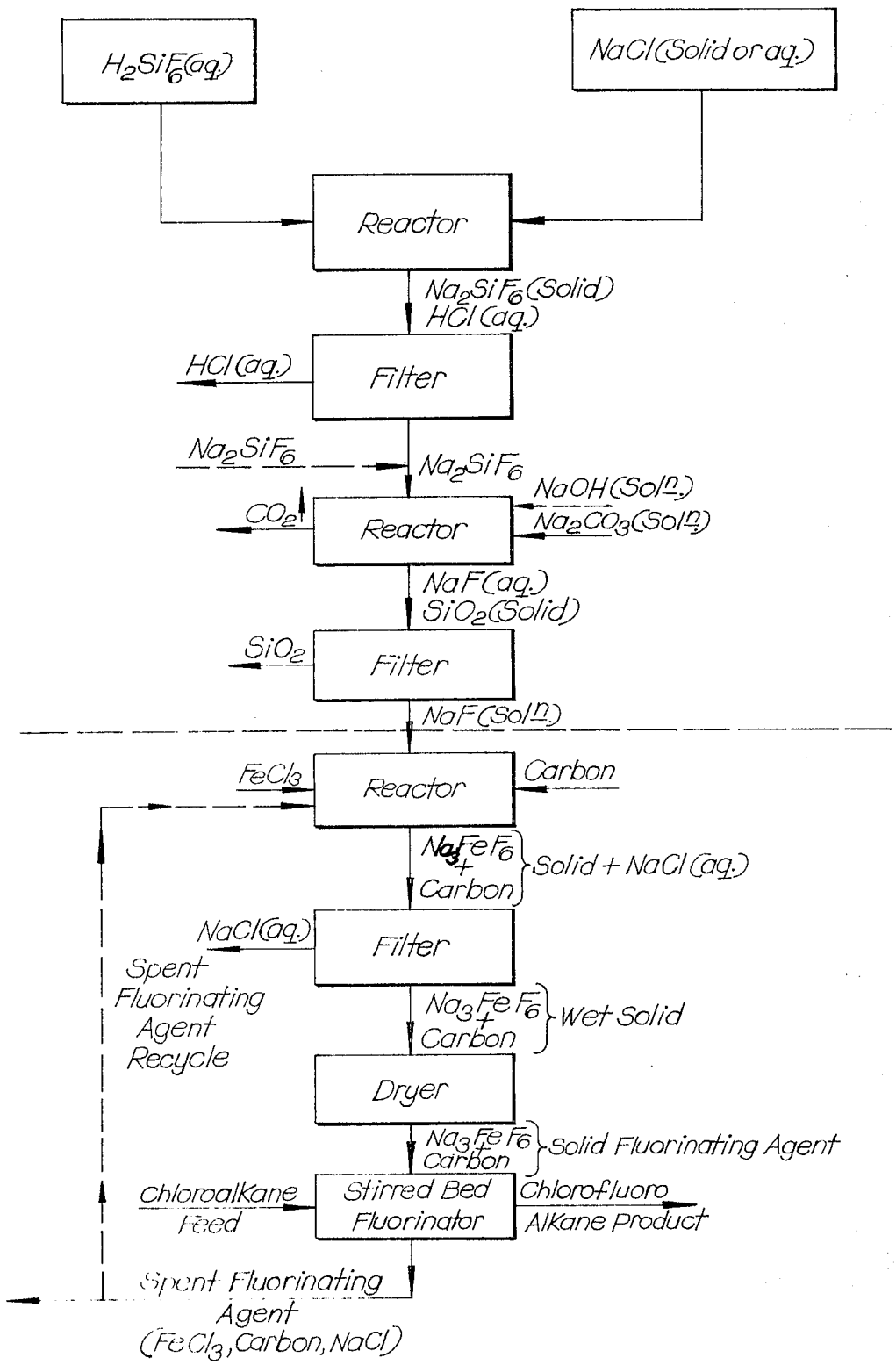
FIG. 1 represents in a schematic manner an advantageous embodiment for the preparation of the fluorinating agent of the instant invention. The process steps shown above the dotted line and by dotted lines are considered optional, since the sodium fluoride constituent of the sodium fluoferrate can be readily obtained from sources other than fluosilicic acid.

A fluorinating agent consisting essentially of sodium fluoferrate ($Na_3FeF_6$) in intimate admixture with carbon particles is provided for the vapor-phase fluorination of chloroalkanes having up to two carbon atoms in a stirred bed reactor. The $Na_3FeF_6$:carbon particle weight ratio in the agent is kept at 1:1 to 1:9 and the fluorination is accomplished within the temperature range of 200° C. and 450° C. without agglomeration of the agent or loss of effectiveness due to coating of the agent with spent fluorinating composition. The particle size of the carbon is kept within the range of 0.05–1.7 mm. and calcined, petroleum coke free of inorganic oxides and volatile components, was found to provide best results. Preparation of the fluorinating agent is accomplished by the reaction of NaF with $FeCl_3$ in an aqueous medium which provides $Na_3FeF_6$, wherein the mole ratio of NaF:$FeCl_3$ is kept within 5.5–6.6:1, preferably within 5.7–6.3:1. The carbon particles can be added to the aqueous medium prior to the precipitation of the $Na_3FeF_6$, during the precipitation or after. Dry admixture of the $Na_3FeF_6$ with the carbon dispersant is also contemplated. Drying of the fluorinating agent is advantageously accomplished in a substantially oxygen-free atmosphere. Vapor-phase fluorination of chloroalkane feeds is accomplished either batchwise or in a continuous manner using average residence times between 5–300 seconds and gas hourly space velocities of 10–750, expressed as gaseous feed volume/bed volume/hour, where the gas volume is measured at 25° C. and 1 atmosphere pressure. Spent fluorinating agent can be readily reused, without intermediate purification, for the preparation of fresh $Na_3FeF$-carbon fluorinating agent.

DETAILED DESCRIPTION OF THE INVENTION

This invention concerns the vapor-phase fluorination of chloroalkanes using as fluorinating agent a mixture of sodium fluoferrate and carbon. More particularly, this invention relates to the vapor-phase fluorination of chloroalkanes in a stirred bed reactor using as fluorinating agent a mixture of sodium fluoferrate and carbon, wherein the weight ratio of sodium fluoferrate to carbon in the agent is within the range of about 1:1 to 1:9. Preparation of the fluorinating agent in a novel, efficient and advantageous manner is also described.

For the purposes of this invention, the term "chloroalkane" means chlorinated hydrocarbons having one or two carbon atoms, at least one hydrogen atom of the hydrocarbons being substituted with a chlorine atom. Representative examples of the chloroalkanes suitable for being fluorinated by exchange of chlorine with fluorine, using the fluorinating agent of the instant invention include without limitation $CH_3Cl$, $CH_2Cl_2CHCl_3$, $CCl_4$, $C_2H_5Cl$, $C_2H_4Cl_2$ (including isomers), $C_2H_3Cl_3$ (including isomers), $C_2H_2Cl_4$ (including isomers), $C_2HCl_5$ and $C_2Cl_6$. These chlorinated hydrocarbons are in the vapor phase within the temperature range of about 200° C. and 450° C. at or near normal atmospheric pressure.

The sodium fluoferrate fluorinating agent employed in the fluorination of chloroalkanes can be prepared in accordance with the following equation from ferric chloride and sodium fluoride:

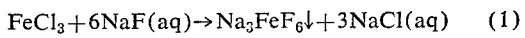

$$FeCl_3 + 6NaF(aq) \rightarrow Na_3FeF_6\downarrow + 3NaCl(aq) \quad (1)$$

The sodium fluoride required for this reaction can be obtained from several sources, one convenient method being the conversion of fluosilicic acid ($H_2SiF_6$) with sodium chloride and sodium carbonate or sodium hydroxide to sodium fluoride.

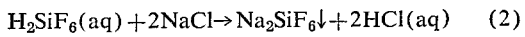

$$H_2SiF_6(aq) + 2NaCl \rightarrow Na_2SiF_6\downarrow + 2HCl(aq) \quad (2)$$

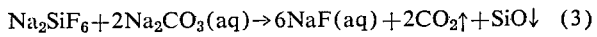

$$Na_2SiF_6 + 2Na_2CO_3(aq) \rightarrow 6NaF(aq) + 2CO_2\uparrow + SiO\downarrow \quad (3)$$

or

$$Na_2SiF_6 + 4NaOH(aq) \rightarrow 6NaF(aq) + SiO_2\downarrow + 2H_2O \quad (4)$$

Fluosilicic acid is readily available, generally in aqueous solution containing 5–20% by weight $H_2SiF_6$ and depending on the concentration of the fluosilicic acid, NaF solutions of varying concentrations can be obtained. For the purposes of this invention, the NaF solution generated by the conversion of fluosilicic acid in accordance with equations (2) and (3) should contain from about 0.5% to about 4.2% by weight NaF, 4.2% by weight being the saturation concentration at 18° C. While NaF solutions containing less than about 0.5% by weight NaF can also be employed for the preparation of sodium fluoferrate, economically the 0.5% by weight minimum concentration is preferred for the present process. It is also advantageous to have a low $SiO_2$ impurity level in the NaF solution, in order to avoid possible contamination of the sodium fluoferrate and consequent generation of $CO_2$ byproduct during the fluorination of chloroalkanes. Naturally, for the preparation of sodium fluoferrate, if one desires, commercially available NaF can also be utilized.

The preparation of sodium fluoferrate proceeds in accordance with equation (1). For best yields the mole ratio of NaF to $FeCl_3$ is generally maintained in the range of about 5.4–6.6 moles of NaF to 1 mole of $FeCl_3$, NaF:$FeCl_3$ mole ratios of 5.7–6.3:1 being preferred.

The reaction is conveniently conducted within the temperature range of about 15° C. and the boiling point temperature of the reaction mixture; for best results the sodium fluoferrate preparation is conducted within a temperature range of about 30° C. and 80° C. Due to the relative insolubility of sodium fluoferrate in aqueous systems (about 0.2% by weight at 20° C.), the yield of $Na_3FeF_6$ is nearly quantitative within the temperature ranges indicated. In order to avoid formation of undesired byproducts during the $Na_3FeF_6$ preparation, the pH of the reaction mixture should be maintained in a manner as to obtain a final pH of about 2.5–5 in the reaction mixture. This can be achieved, for example, by the controlled addition of the reactants. At pH values above about 5, conversion of a portion of the ferric salts to $Fe(OH)_3$ and $Fe_2O_3$ may occur. During subsequent drying any $Fe(OH)_3$ in the product is converted to $Fe_2O_3$ and the presence of $Fe_2O_3$ in the fluorinating agent can cause undesired side reactions during fluorination. It is advantageous, therefore, to maintain a substantially oxygen-free atmosphere during drying and conventional means, such as a nitrogen sweep over the reaction mixture, can be suitably employed. The preparation of $Na_3FeF_6$ can be accomplished in a batchwise manner, or if desired, continuous feeding of the reactants and continuous removal of the formed $Na_3FeF_6$ results in a semi-continuous or continuous process.

The carbon constituent of the novel fluorinating agent is suitably of small particle size. In genral, a carbon particle size range of 0.05–1.7 mm. was found to be suitable and particularly good physical and chemical properties were imparted to the fluorinating agent when the carbon particles used were in the size range of about 0.07–0.85 mm. Particles having a size below about 0.05 mm. can cause severe dusting problems in the fluorination reaction, while particles larger than about 1.7 mm. do not provide any particular advantage. The carbon utilized in the fluorinating agent can be obtained from any suitable source, provided it is substantially free of inorganic impurities and its volatilizable content is low. Particularly, the presence of iron oxides and silica should be avoided, since the presence of these contaminants, as mentioned before, can result in the formation of undesired byproducts during the fluorination of chloroalkanes. A suitable carbon source for incorporation in the fluorinating agent was found to be calcined petroleum coke, which due to its surface properties was observed to impart the desired properties to the fluorinating agent. These include supplying an accessible surface for sorption of any volatilized $FeCl_3$ decomposition product, with consequent avoidance of coating of the remaining $Na_3FeF_6$ with $FeCl_3$.

The quantity of carbon dispersant to be added to the sodium fluoferrate is established by the following criteria. As the vapor-phase fluorination of the chloroalkanes in accordance with the present invention proceeds in a stirred bed reactor, preferably wherein the fluorinating agent is continuously moved along the vertical axis of the reactor in plug flow, care must be taken that no agglomeration of the fluorinating agent should occur and also that the fluorinating agent should remain substantially free-flowing. By the term "free-flowing" it is understood that stirring of the bed should not be hindered by the increased viscosity caused by the conversion of the $Na_3FeF_6$ fluorinating agent during use to a mixture of $FeCl_3$ and NaCl.

To satisfy the above-described requirements, it was found that the carbon constituent should be present in at least a 1:1 weight ratio in the fluorinating agent comprising sodium fluoferrate and carbon. Advantageously, the $Na_3FeF_6$ to carbon ratio in the fluorinating agent is maintained within the 1:1 and 1:9 weight ratio. In other words, the novel fluorinating agent, comprising sodium fluoferrate and carbon, should contain at least about 50% by weight of carbon and up to about 90% by weight carbon. Carbon contents below about 50% by weight can result in serious process problems; carbon contents in excess of about 90% by weight can reduce the efficiency of the fluorinating agent below the economic and desired level.

Incorporation of the carbon dispersant in the novel fluorinating agent can be accomplished in different ways provided it results in an intimate mixture. In one advantageous embodiment, the carbon particles are dispersed in the aqueous reaction mixture of $FeCl_3$ and NaF and kept in dispersion by agitation. Precipitation of $Na_3FeF_6$ occurs in the presence of the carbon particles which due to their small size can act as nuclei for the $Na_3FeF_6$ compound. In this system, the sodium fluoferrate may also deposit on the carbon surface, thus providing a uniformly distributed $Na_3FeF_6$ coating on the dispersant with correspondingly increased effectiveness due to the easy availability of the fluorinating agent to the vapor-phase chloroalkanes.

Addition of the carbon dispersant to the sodium fluoferrate can also proceed after the precipitation and recovery of the $Na_3FeF_6$ from the $FeCl_3$-NaF reaction mixture. The dispersant and the sodium fluoferrate can be admixed while the sodium fluoferrate is still wet or if desired, the $Na_3FeF_6$ can be predried at about 105–400° C. prior to admixture with the carbon particles. In any event, whether the admixture of these two components is accomplished prior to or after drying, or if the precipitation of the $Na_3FeF_6$ proceeds in the aqueous system in the presence of the dispersant, the drying step should be conducted in a nonoxidizing atmosphere, such as vacuum or under blanket of an inert gas, for example nitrogen, argon and the like. Absence of oxygen will prevent the possibility of oxidizing the $Na_3FeF_6$ to the undesired $Fe_2O_3$. Drying is best accomplished in stages, wherein in the first stage most of the water is evaporated at temperatures at or below 100° C., followed by a second stage, final drying at temperatures in the 105° C.–400° C. range.

Figure 2:
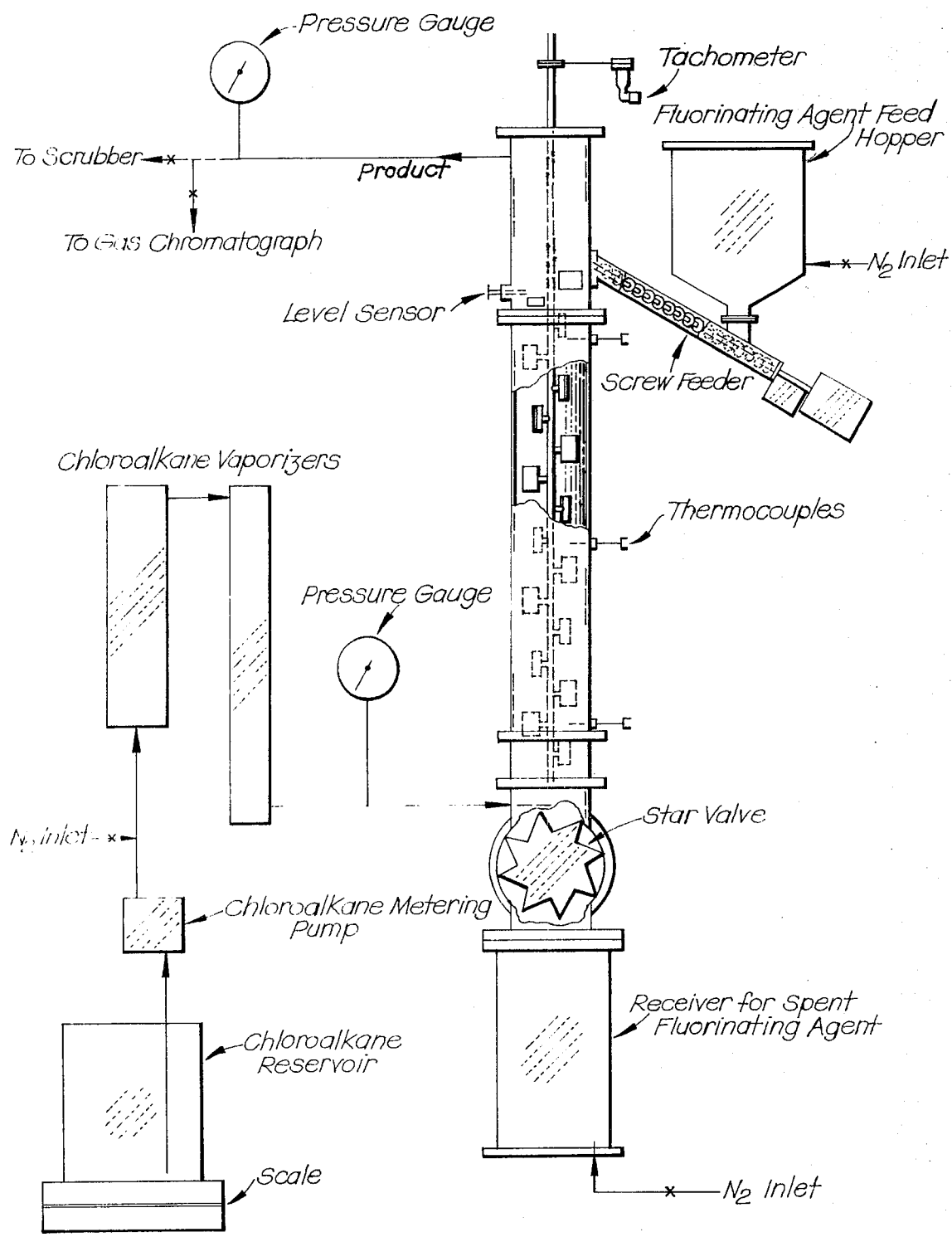
FIG. 2 presents a suitable apparatus for the continuous, vaporphase fluorination of chloro-alkanes using the novel fluorinating agent.

The dry fluorinating agent can then be readily employed for the vapor-phase fluorination of chloroalkanes in an apparatus, such as shown for example in FIG. 2. The fluorination is advantageously accomplished in a vertical, stirred bed reactor wherein the fluorinating agent is continuously moved under stirring in plug flow either concurrently or countercurrently with the stream of vaporized chloroalkanes. The fluorination of the vapor-phase chloroalkanes, using the $Na_3FeF_6$-carbon dispersant fluorinating agent, is generally conducted at temperatures from about 200° C. to about 450° C. Particularly good yields and rates of conversion were observed within the temperature range of about 250° C. to about 420° C. Temperatures below about 200° C. provide economically undesirable low rates of conversion, while temperatures in excess of about 450° C. may cause decomposition of the chloroalkane feed. The vapor-phase fluorination of chloroalkanes using the instant sodium fluoferrate-dispersant mixture can be conducted at atmospheric pressure or if desired at pressures in excess of the atmospheric, for example at pressures in the range of 1.05–10 atmospheres. The upper limit of the pressures to be employed is limited by the possible condensation of the feed and/or the fluorinated chloroalkanes in the fluorination reactor.

The fluorination rate of the chloroalkanes using a stirred bed of $Na_3FeF_6$-carbon fluorinating agent generally depends on the volume of the stirred bed employed and on the flow rate of the chloroalkane feed. Hourly gas space velocities in the range of about 10–750 feed volume (calculated at 25° C. and 1 atmosphere pressure)/bed volume/ hour were found to provide satisfactory conversion rates at average residence times or contact times within the range of about 5 to about 300 seconds. Fluorination of chloroalkanes using the instant fluorinating agent can be accomplished either in a batchwise or in a continuous manner. If the fluorination proceeds in a batchwise manner, the bed of fluorinating agent is continuously stirred and the chloroalkane is charged to the system at such a rate as to provide the necessary residence time within the system. The rate of conversion is constantly monitored and when it is observed that the product stream contains a significant quantity of unconverted feed indicating exhaustion of the fluorinating agent the fluorination is discontinued and the exhausted fluorinating agent is recovered. In a continuous vapor-phase fluorinating process, exhausted or partly exhausted fluorinating agent is continuously removed from the stirred reactor and fresh fluorinating agent is continuously charged to the reactor. The rate of removal of exhausted fluorinating agent is generally adjusted to the composition of the product stream in order to obtain steady conditions within the system, that is to obtain a product stream of substantially constant composition.

Whether the fluorinating agent of the instant invention is being employed in a batchwise manner or in a continuously operating reactor, the fluorinating agent remains in a stirrable condition and substantially all of its fluorine content can be exchanged for chlorine, thus providing an important technical and economic advantage over the existing vapor-phase fluorination processes employing a solid fluorinating agent as the source of fluorine.

The exhausted fluorinating agent, containing $FeCl_3$, NaCl and the dispersant, can be readily and directly recycled to the preparation of fresh fluorinating agent. It is unnecessary to subject the exhausted fluorinating agent to a purification step, such as washing, such as is required for the regeneration of exhausted, $CaCl_2$-coated $CaF_2$. The entire exhausted fluorinating agent can be reused for the preparation of fresh $Na_3FeF_6$-dispersant by providing an aqueous slurry of the agent to which sufficient NaF is then added to reconvert the $FeCl_3$ to $Na_3FeF_6$. As the NaCl byproduct of the vapor-phase fluorination reaction is water-soluble and the $Na_3FeF_6$ product is substantially water-insoluble, no involved purification steps are required which further distinguishes the instant fluorinating agent from those previously employed. The reconverted $Na_3FeF_6$-dispersant fluorinating agent performs in the same efficient manner as $Na_3FeF_6$-carbon mixture prepared from fresh, unused reactants.

The following Examples are presented to further illustrate the novel aspects of the instant invention.

EXAMPLE I

Preparation of the $Na_3FeF_6$-Dispersant Fluorinating Agent (A) A 10 liter container, equipped with a stirrer was charged with 6500 ml. deionized water, 252 grams (6 moles) sodium fluoride (technical grade) and 470 grams of calcined, delayed petroleum coke (particle size 0.07–0.8 mm.). To the stirred mixture 270.2 grams (1 mole) $FeCl_2 \cdot 6H_2O$ was added together with 175.5 grams (3 moles NaCl dissolved in 1 liter deionized water. The temperature of the mixture was kept at 20° C. and the stirring was continued for 15 minutes. The final pH of the mixture was 4.5 and after allowing the solids to settle overnight, the clear supernatant liquor was decanted and discarded.

The solids were filtered, dried at 25° C. for 24 hours, then overnight at 110° C. in a vacuum oven and finally dried further at 300° C. for 2 hours. The recovered solids (708 grams) contained 31.4% by weight $Na_3FeF_6$, which corresponds to a 93.4% $Na_3FeF_6$ yield. The product contained less than about 0.2% $Fe_2O_3$.

(B) A 10 liter container equipped with a stirrer was charged with 6.5 liter deionized water and 252 grams (6 moles) NaF (technical grade). The solution was heated to about 55° C. and 270.2 g. (1 mole) $FeCl_9 \cdot 6H_2O$, together with 175.5 g. NaCl (3 moles) dissolved in 700 ml. deionized water was poured in the solution. After stirring for 15 minutes, the mixture was allowed to stand overnight at 23–25° C., then the solids were filtered and dried at 110° C. overnight. The yield of $Na_3FeF_6$ was 98.2%.

(C) 1600 grams of exhausted fluorinating agent, obtained from a mixture of 1327 grams of coke and 93 grams of $Na_3FeF_6$, were slurried in deionized water. The coke was separated from the aqueous solution and was washed to remove any adhering inorganic compound. The solution and the washings (6.0 liters) were combined and analyzed. Analyzing indicated 100% Fe recovery (45.2 g.), 98% Cl recovery (166.8 g.), and a small quantity of F (0.3 g.), indicating a 99.7% conversion of the $Na_3FeF_6$ to $FeCl_3$ and NaCl.

A solution of 168.2 grams NaF (4.03 moles) in 4 liter deionized water was prepared and 315 grams (dry weight) of the washed coke was dispersed in the water by agitation. Subsequently, 5 liters of combined solution and washings containing 0.675 moles of Fe and 1.82 moles of Na, were added and the agitation of the mixture was continued for an additional 15 minutes. After settling the mixture overnight, the clear supernatant was decanted and discarded. The solids were filtered, dried at 25° C. for about 24 hours, then at 110° C. overnight in a vacuum oven, followed by a last stage drying at 300° C. for 2 hours. Analysis of the solids showed a 30.1% by weight $Na_3FeF_6$ content corresponding to a 98.5% $Na_3FeF_6$ yield.

(D) Aqueous fluosilicic acid ($H_2SiF_6$), containing about 10% $H_2SiF_6$ was reacted with NaCl. The precipitated $Na_2SiF_6$ was washed, combined with aqueous $Na_2CO_3$ and the reaction mixture was kept at 65–100° C. C. for 1–3 hours until all of the $CO_2$ was removed from the reaction mixture. The precipitated silica was separated from the NaF solution and the NaF solution containing about 3.7% by weight NaF was employed as the source of fluorine in the preparation of the $Na_3FeF_6$-coke fluorinating agent in accordance with the process described under (A). Analysis of the mixture indicated an $Na_3FeF_6$ yield of 99.0%.

EXAMPLE II

Fluorination of Carbon Tetrachloride ($CCl_4$) in a Batchwise Manner

A stainless steel reactor of 3.5 cm. internal diameter and 75 cm. total length, equipped with a paddle-type stirrer, was charged with 200 grams of fluorinating agent containing 60.8 grams of $Na_3FeF_6$ (sodium fluoferrate: coke ratio 1:2.3). The stirrer was started and the reactor heated under a flow of nitrogen. When the temperature of the bed reached 300° C., vaporized $CCl_4$ at 300° C. was charged to the bottom of the reactor at a rate of 191 g./hour (corresponding to 0.020 moles of $CCl_4$/minute). The temperature of the reactor was kept at 300° C.±2° C. throughout the entire reaction and the carbon tetrachloride feed was continued at this rate until the product stream, collected at the top of the reactor, consisted mainly of unreacted $CCl_4$ (after 257 minutes). The product stream was continuously analyzed and the results are shown in Table I. After cooling of the reactor, the fluorinating agent was found to be homogeneous and there was no evidence of agglomeration. Analysis of the exhausted fluorinating agent showed a fluorine to chlorine conversion in excess of 98%.

TABLE I

[Vapor-phase fluorination of $CCl_4$ with $Na_3FeF_6$-coke fluorinating agent at 300° C.]

| | Product stream composition in mole percent | | | |
|---|---|---|---|---|
| Reaction time in minutes | $CCl_3F$ | $CCl_2F_2$ | $CCl_4$ | Others, such as $N_2$ |
| 14 | 28.7 | traces | 69.0 | 2.3 |
| 37 | 52.8 | 0.3 | 44.0 | 2.9 |
| 77 | 83.9 | 9.4 | 4.0 | 2.7 |
| 112 | 48.9 | 47.4 | 2.1 | 1.6 |
| 129 | 55.7 | 40.4 | 2.8 | 1.1 |
| 162 | 57.3 | 38.9 | 3.0 | 0.8 |
| 192 | 57.0 | 10.1 | 32.4 | 0.5 |
| 257 | 5.8 | 0.5 | 93.7 | 0 |

EXAMPLE III

Vapor-phase Fluorination of $CCl_4$ Using $Na_3FeF_6$ Alone As Fluorinating Agent at 300° C In A Batchwise Manner The vapor-phase fluorination of $CCl_4$ was repeated in accordance with the process described in Example II, using the same apparatus, but using $Na_3FeF_6$ fluorinating agent without the coke dispersant. The product stream was continuously analyzed and the results are shown in Table II. It was found that the yield of conversion of $CCl_4$ to fluorinated products was lower than when using the sodium fluoferrate-coke fluorinating agent, the composition of the product stream fluctuated over a wide range and the time required for substantially total exchange of F with Cl in the fluorinating agent was about twice as long in comparison to the time shown in Table I. In addition, when the cooled reactor was opened, it was observed that concentric ridges of spent fluorinating agent strongly adhered to the walls of the reactor and to the stirrer paddles. These results clearly indicate that the use of $Na_3FeF_6$ alone as fluorinating agent results in inefficient and troublesome operation even in a batch process and due to the agglomeration of the fluorinating agent and its strong adherence to the reactor walls, continuous passage of the fluorinating agent would become impossible.

TABLE II

| | Product stream composition in mole percent | | | |
|---|---|---|---|---|
| Reaction time in minutes | $CCl_3F$ | $CCl_2F_2$ | $CCl_4$ | Others, such as $N_2$ |
| 18 | 86.7 | 1.6 | 5.1 | 6.6 |
| 35 | 87.8 | 3.1 | 3.6 | 5.5 |
| 75 | 74.7 | 19.8 | 2.4 | 3.1 |
| 126 | 76.8 | 10.0 | 7.9 | 3.3 |
| 165 | 67.6 | 22.1 | 7.8 | 2.5 |
| 193 | 55.1 | 36.9 | 6.4 | 1.6 |
| 218 | 65.3 | 20.1 | 13.0 | 1.6 |
| 255 | 59.3 | 25.1 | 13.7 | 1.9 |
| 325 | 49.4 | 12.9 | 37.6 | 0.1 |
| 350 | 52.4 | 39.4 | 6.3 | 1.9 |
| 400 | 37.4 | 5.8 | 56.5 | 0.3 |
| 469 | 41.4 | 26.5 | 31.3 | 0.8 |
| 485 | 28.3 | 17.3 | 53.6 | 0.8 |

EXAMPLE IV

Vapor-phase Fluorination of $CCl_4$ Using $Na_3FeF_6$-Coke (1:9 Weight Ratio) Fluorinating Agent at 360° C. in a Continuous Reactor A continuous reactor, such as shown in FIG. 2 having an internal diameter of 7.62 cm. and a vertical height of 54.6 cm. was charged with 11 kg. sodium fluoferrate-coke dispersant fluorinating agent. The fluorinating agent contained 10.65 grams of $Na_3FeF_6$/100 grams of agent. After charging, the reactor was purged with nitrogen and the stirrer was started. The temperature of the fluorinating agent was raised to 360°C.±2°C. and $CCl_4$ was then introduced in the reactor in the vapor state at a rate of 9.7 grams/minute. The nominal residence time of the vapors in the reactor was 1 minute. The spent fluorinating agent was continuously removed at the bottom of the reactor after an initial 117 minutes through a slowly rotating star valve set to a constant r.p.m. and fresh fluorinating agent was introduced at the top of the reactor at such a rate as to replace the removed, spent agent. The level of the bed was continuously monitored with an electrical conductivity sensor and the charge of fresh agent was controlled in a manner so as to retain the same bed height throughout the fluorination. The composition of the product stream was continuously monitored by gas chromatography. The reactor was continuously operated for 335 minutes. The product stream analysis is shown in Table III. After cooling, the exhausted fluorinating agent was analyzed for fluorine content and it was found that the fluorine to chlorine conversion was in excess of about 98%. In addition, the inside of the reactor was checked and it was found that no fluorinating agent adhered either to the walls of the reactor or to the paddles of the stirrer. The spent fluorinating agent was also free of agglomerates.

The continuous vapor-phase fluorination of $CCl_4$ was repeated, using sodium fluoferrate:coke weight ratios of 5:1, 3:1 and 1:1. In all of these instances, both the rate of chloroalkane conversion and the smoothness of the operation remained the same as in the above Example. A control experiment using $Na_3FeF_6$ alone, without the coke dispersant, had to be discontinued after approximately 130 minutes, due to severe plugging and inability of the stirrer to move the spent agent through the reactor.

TABLE III

| Reaction time in minutes | Product stream composition in mole percent | | | |
|---|---|---|---|---|
| | $CCl_3F$ | $CCl_2F_2$ | $CCl_4$ | Others, such as $N_2$ |
| 25 | 87.7 | 2.9 | 2.5 | 6.9 |
| 45 | 81.8 | 10.5 | 2.4 | 5.3 |
| 82 | 74.2 | 20.8 | 1.9 | 3.1 |
| 101 | 43.0 | 45.9 | 1.2 | 9.7 |
| 117 | 55.9 | 32.6 | 1.8 | 9.7 |
| 160 | 32.2 | 62.2 | 0.6 | 5.0 |
| 196 | 41.3 | 54.2 | 0.9 | 3.6 |
| 232 | 62.4 | 32.7 | 1.6 | 3.3 |
| 296 | 68.6 | 28.4 | 1.7 | 1.3 |
| 313 | 64.7 | 30.8 | 1.5 | 3.0 |
| 335 | 76.5 | 19.3 | 1.8 | 2.4 |

EXAMPLE V

Vapor-phase Fluorination of $CHCl_3$ Using $Na_3FeF_6$-Coke Fluorinating Agent (1:2 Weight Ratio) at 325° C. in a Batch Reactor The reactor described in Example II was charged with 200 grams of fluorinating agent containing 30.8 grams of $Na_3FeF_6$/100 grams of agent. The coke had a particle size in the range of 0.07–0.84 mm. The stirrer was started and the reactor was purged with $N_2$ while the reactor was being heated to 325° C. Chloroform was then vaporized at the rate of 6 ml. liquid/hour (0.075 moles/hour) and the vapors introduced into the reactor. The pressure in the reactor was kept at 1–2 p.s.i.g. throughout the fluorination. The vapor-phase fluorination was continued until the $CHClF_2$ concentration in the product stream reached a maximum at which time the fluorination was discontinued. The analysis of the product stream is shown in Table IV. There was no evidence of agglomeration of the fluorinating agent or of plugging of the reactor.

In another similar experiment, fluorination was continued until the conversion of $CHCl_3$ to fluorocarbons decreased to low levels indicating exhaustion of the fluorinating agent. Analysis of the spent fluorinating agent established that the conversion of fluorine to chlorine was in excess of 95%.

TABLE IV

| Reaction time in hours | Product stream composition in mole percent | | | | |
|---|---|---|---|---|---|
| | $CHCl_2F$ | $CHClF_2$ | $CHF_3$ | $CHCl_3$ | Other, such as $N_2$ |
| 1 | | | | | |
| .2 | 16.6 | 0.5 | 0 | 53.6 | 29.3 |
| 2.8 | 40.1 | 0.7 | 0 | 50.1 | 9.1 |
| 4.5 | 42.2 | 0.8 | 0 | 49.9 | 7.1 |
| 14.2 | 43.0 | 1.4 | 0 | 51.4 | 4.2 |
| 15.0 | 50.4 | 6.6 | 0.2 | 38.1 | 4.7 |
| 16.2 | 49.1 | 15.2 | 0.7 | 31.0 | 4.0 |
| 17.3 | 44.3 | 22.6 | 1.1 | 28.1 | 3.9 |
| 19.5 | 37.9 | 34.0 | 1.7 | 23.2 | 3.2 |
| 21.2 | 33.2 | 40.7 | 2.8 | 19.0 | 4.3 |
| 23.8 | 29.7 | 45.1 | 5.0 | 17.3 | 2.9 |
| 24.8 | 32.7 | 40.3 | 4.7 | 19.1 | 3.2 |
| 26.5 | 35.7 | 35.4 | 4.6 | 21.5 | 2.8 |
| 27.3 | 38.7 | 30.4 | 3.7 | 24.3 | 2.9 |

EXAMPLE VI

The vapor-phase fluorination of $CHCl_3$ was repeated, using as fluorinating agent a 1:3 mixture of $Na_3FeF_6$-coke dispersant, in the continuous reactor shown in FIG. 2. The fluorination proceeded smoothly and efficiently without observing agglomeration or loss of effectiveness of the fluorinating agent. In contrast, when the sodium fluoferrate was used alone, without the addition of the dispersant, rapid deterioration of the fluorinating efficiency was observed and the reactor had to be shut down prematurely (after approximately 45% exchange of fluorine to chlorine) due to operating difficulties, including loss of stirring and overheating of the stirrer motor as a result of the significantly increased resistance within the stirred bed.

These examples clearly show the novelty and utility of the instant fluorinating agent and demonstrate results heretofore unavailable by employing the conventional, inorganic, fluorine containing agents. In addition, the use of the instant sodium fluoferrate-coke dispersant fluorinating agent allows ready regeneration without involved and costly purification steps associated with the prior art inorganic, fluorinating agents, particularly with $CaF_2$-containing fluorinating compositions.

What is claimed is:

1. A free-flowing, non-agglomerating fluorinating agent for the vapor-phase, stirred-bed fluorination of chloroalkanes having up to two carbon atoms at temperatures between about 200° C. and 450° C., which consists essentially of an intimate mixture of sodium fluoferrate ($Na_3FeF_6$) and particulate carbon, substantially free of inorganic oxides and volatile components, wherein the sodium fluoferrate to carbon weight ratio is within the range of 1:1 and 1:9 and the particle size of the carbon being within the range of about 0.05–1.7 mm.

2. Composition of claim 1, wherein the carbon particle size is within the range of 0.07–0.85 mm.

3. Composition of claim 1, wherein the carbon particle is calcined petroleum coke.

4. A process for producing a fluorinating agent for the vapor-phase fluorination of chloroalkanes having up to two carbon atoms in a stirred solid bed at temperatures within the range of 200° C. to 450° C., which comprises: admixing in an aqueous medium sodium fluoride with ferric chloride in a mole ratio of 5.4 to 6.6 moles of NaF per mole of $FeCl_3$ at a temperature within the range of about 20° C. and the boiling point temperature of the aqueous mixture to obtain a precipitate consisting essentially of sodium fluoferrate ($Na_3FeF_6$), separating the sodium fluoferrate precipitate from the aqueous medium and drying the precipitate at a temperature within the range of about 105° C. and about 400° C.; intimately admixing with the sodium fluoferrate carbon particles in a weight ratio of 1:1 to 1:9, the carbon being substantially free of inorganic oxides and having a particle size within the range of 0.05 and 1.7 mm., and recovering the fluorinating agent.

5. Process according to claim 4, wherein the carbon is calcined petroleum coke.

6. Process according to claim 4, wherein the NaF:FeCl$_3$ mole ratio is from about 5.7 to 6.3:1.

7. A process for producing a Na$_3$FeF$_6$-carbon dispersant fluorinating agent for the vapor-phase fluorination of chloroalkanes having up to two carbon atoms in a stirred, solid bed at a temperature within the range of 200° C. and 450° C., which comprises: admixing under agitation in an aqueous medium, having suspended therein carbon particles of the size within the range of 0.05 and 1.7 mm. and in an amount sufficient to provide a Na$_3$FeF$_6$:carbon weight ratio of 1:1 to 1:9, 5.4 to 6.6 moles of NaF per mole of FeCl$_3$, maintaining the mixture within the temperature range of 15° C. and the boiling point temperature of the mixture, precipitating sodium fluoferrate, separating the total solids from the aqueous medium and recovering a fluorinating agent consisting essentially of Na$_3$FeF$_6$ and carbon.

8. Process according to claim 7, wherein the FeCl$_3$ and carbon content of spent fluorinating agent is directly used for the preparation of fresh Na$_3$FeF$_6$-carbon dispersant.

References Cited

UNITED STATES PATENTS

| 2,568,660 | 9/1951 | Rosen | 260—653.8 |
|---|---|---|---|
| 2,739,989 | 3/1956 | Barringer et al. | 260—653.8 |
| 3,146,275 | 8/1964 | Dahmlos | 260—653.8 |
| 3,334,151 | 8/1967 | Okazaki | 260—653.8 |
| 3,679,767 | 7/1972 | Vecchio | 260—653.8 |

FOREIGN PATENTS

BENJAMIN R. PADGETT, Primary Examiner.

I. GLUCK, Assistant Examiner

U.S. Cl. X.R.

260—653.8; 423—464, 490, 493, 499

UNITED STATES PATENT OFFICE
CERTIFICATE OF CORRECTION

Patent No. 3,843,546      Dated October 22, 1974

Inventor(s) Igor Sobolev and Erwin Panusch

It is certified that error appears in the above-identified patent and that said Letters Patent are hereby corrected as shown below:

Column 6, line 70, "$FeCl_2 \cdot 6H_2O$" should be --$FeCl_3 \cdot 6H_2O$--

Column 6, line 71, "moles" should be --moles)--

Column 7, line 10, "$FeCl_9 \cdot 6H_2O$" should be --$FeCl_3 \cdot 6H_2O$--

Column 7, line 22, "Analyzing" should be --Analysis--

Column 7, line 26, "168.2" should be --169.2--

Column 7, line 42, "65-100° C." should be --65-100°--

Column 10, line 6, "$^1$.2" should be --1.2--

Column 10, line 54, "carbon particle" should be --carbon--

Signed and sealed this 31st day of December 1974.

(SEAL)
Attest:

McCOY M. GIBSON JR.
Attesting Officer

C. MARSHALL DANN
Commissioner of Patents